April 25, 1944.  J. L. FOLEY ET AL  2,347,598

ELECTRIC ARC WELDING ELECTRODE HOLDER

Filed April 7, 1943

INVENTORS
JOHN L. FOLEY AND
DANIEL B. MALARKEY
BY
Beau, Brooks, Buckley & Beau.
ATTORNEYS Patented Apr. 25, 1944

2,347,598

UNITED STATES PATENT OFFICE 2,347,598

ELECTRIC ARC WELDING ELECTRODE HOLDER

John L. Foley and Daniel B. Malarkey, Buffalo, N. Y.; said Foley assignor to Hobart Sales Service Supplies, Buffalo, N. Y.

Application April 7, 1943, Serial No. 482,120

4 Claims. (Cl. 219—8)

This invention relates to welding electrode holders, and more particularly to improvements in holders for electrodes of the electrical arc welding type.

It is an object of the present invention to provide an improved welding electrode-holder in the form of a hand tool adapted to be employed with improved facility and convenience to the operator for the purpose of gripping welding electrodes or the like while performing welding operations. Another object is to provide a holder for the purpose described which is of such nature as to be adapted to function in improved manner as a conductor of current to the electrode. Another object is to provide a holder of the character described which is adapted to permit replacement of spent electrodes in improved manner. Another object is to provide a holder of the character described which is of structurally simple and rugged form, and which is otherwise adapted to withstand the rigors of its intended service in improved manner. Other objects and advantages of the invention will appear from the specification hereinafter.

Figure 1:
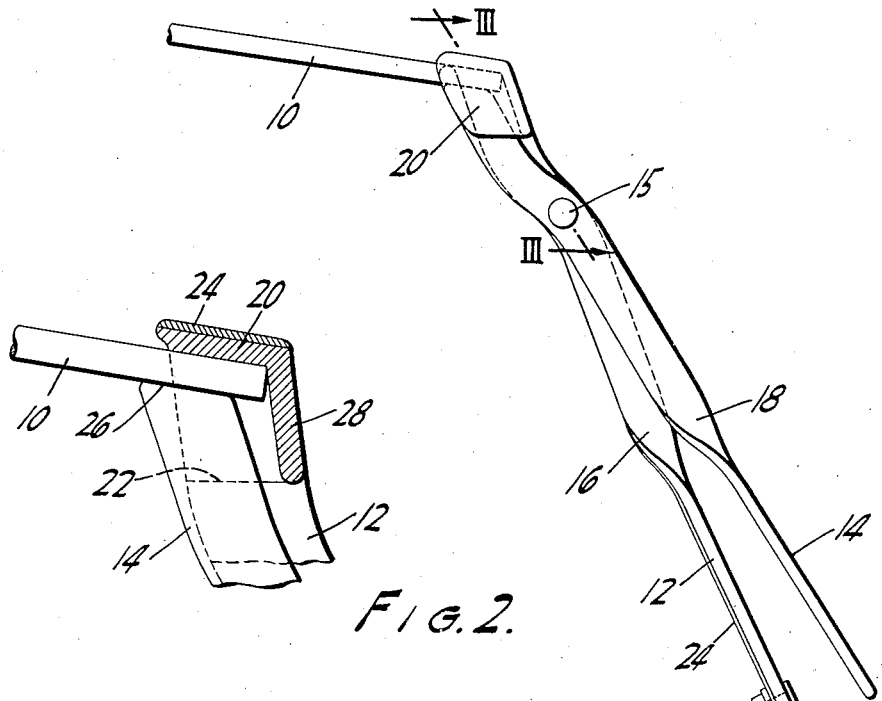
Fig. 1 is a side elevation of a holder of the invention in operative position relative to a welding electrode.
Figure 2:
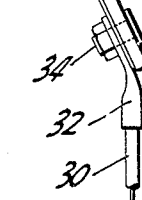
Fig. 2 is an enlarged sectional view of the electrode gripping portion of the tool.
Figure 3:
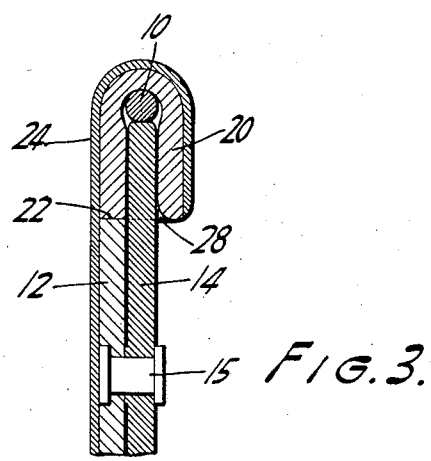
Fig. 3 is a section, on an enlarged scale, taken substantially along line III—III of Fig. 1.

The drawing illustrates the invention in the form of a hand tool of generally scissors-like form shown in gripping position upon a welding electrode rod 10. The tool comprises generally a pair of handle portions 12—14 made of metal such as steel and hinged together by means of a pin 15. The handle members are twisted at 16—18 to present the lower hand grip portions thereof in flatwise parallel relation (Fig. 1) to provide a more comfortable grip for the operator. Adjacent its upper end the handle member 12 is provided with an inverted U-shaped cap portion designated 20 (Fig. 3), and this cap portion is formed of copper or copper alloy metal or the like for purposes to be explained hereinafter. The cap 20 may be welded or otherwise attached to the handle 12, as indicated at 22. The other handle member 14 is cut off obliquely at its upper end portion, as indicated at 26 (Fig. 2), so as to be adapted to be cammed upwardly and rearwardly against the electrode 10 when the latter is disposed with its end portion interiorly of the cap 20. Thus, it will be understood that the handles of the tool may be squeezed together subsequent to insertion of the rod 10 as illustrated, whereby the camming end portion 26 of the member 14 will firmly grip the welding rod 10 into electrical connection with the cap device 20, and that the tool may then be held in the hand of the operator to present the free end of the electrode to the work with utmost convenience and facility.

An accessory metal piece 24 of high electrical conductivity characteristics is lapped upon the handle member 12 to extend at one side thereof through the length of the handle and thence over and around the cap piece 20. Preferably, the strip 24 will be welded or otherwise firmly connected to the handle and cap piece members so as to provide optimum electrical connections therewith; and thus the entire structure will provide an integral assembly of structurally rigid form. The cap piece 20 is closed at its rear end by means of a wall 28 (Fig. 2), whereby it will be understood that it is impossible for the operator to mount the electrode 10 upon the holder so that it extends rearwardly thereof. Hence, it is impossible for the operator to carelessly mount the electrode so as to waste substantial portions thereof. An electrical conductor 30 is arranged to be electrically connected to the handle-strip 24, as being soldered into a socket 32 which is in turn detachably mounted upon the handle 12 by means of a screwthread connector 34.

Thus, it will be appreciated that the invention provides a hand tool which is adapted to be grasped by the operator in the manner of a pair of tongs or pliers, or the like; the handle portions of which are adapted to be spread so as to open the jaw portions 20—26 whereby one end of an electrode may be thrust into the space between the jaws. When the electrode is thus inserted the rear wall portion 28 of the tool will act to stop the inserting motion at the correct position of the electrode, whereby a firm grip thereon may be obtained by the jaws of the tool without wasteful extension of the electrode rearwardly of the tool jaws. Hence, when the electrode has been used only a small stub portion thereof need be discarded, and useless waste of expensive material is thereby avoided. It will be appreciated that squeezing of the handles of the tool will cause the jaw portion 26 of the tool to cam obliquely into clamping relation upon the electrode, whereby a semi-locked connection will be automatically provided. Hence, the operator need not maintain full squeezing pressure upon the tool handles subsequent to mounting of the electrode; and yet, whenever an electrode needs replacing the handles of the tool may be spread with utmost facility because the locking connection referred to does not operate to severely bind the tool parts.

It will also be appreciated that due to the fact that the cap portion 20 of the tool is of copper or copper alloy material, the spattering substances which invariably tend to accumulate upon a holder when brought close to an arc welding operation, may be readily cleaned from the tool; and therefore the useful life of the tool may be extended. It will also be appreciated that due to the fact that the cap portion 20 of the tool is of copper or copper alloy, and because the metal stripping 24 is of high electrical conductivity characteristics, the electrical conducting parts of the tool are of optimum electrical capacity and the contact between the electrode 10 and the cap portion 20 will be of maximum conductivity characteristics. Hence, the tendency for the tool to heat will be reduced; and this beneficial result has been obtained in the case of the present invention through use of only small amounts of critical metal materials.

Although only one form of the invention has been shown and described in detail, it will be apparent to those skilled in the art that the invention is not so limited but that various changes may be made therein without departing from the spirit of the invention or the scope of the appended claims.

What is claimed is:

1. A welding electrode holder of hand tool form comprising a pair of scissor type handle portions formed of steel or the like and pivoted together intermediately of their ends, one of said handle members having a reversely turned cap end portion formed of copper or the like and disposed to overhang the adjacent grip end portion of the other of said handle members when in tool-closed position whereby to enclose upon and grip the end of a welding electrode therebetween, the said grip end portion of the other of said handle members being sloped obliquely to the longitudinal axis thereof whereby to cam against the electrode for wedging the latter against said cap end handle portion, said cap portion having a rear wall disposed transversely thereof and adapted to limit the extent of insertion of the electrode into said tool, a metal strip of high electrical conductivity mounted alongside said handle member having said overhanging cap portion and extending about said cap portion in electrical connection therewith to reinforce the latter and to conduct welding current from the lower end of said strip into said overhanging cap portion, and electrical connection means at the lower end of said handle for detachably connecting an electrical conductor to the corresponding end portion of said metal strip.

2. A welding electrode holder comprising a pair of handle portions pivoted together intermediately of their ends, one of said handle members having a reversely turned end portion disposed to overhang the corresponding end portion of the other of said handle members when in tool closed position whereby to enclose upon and grip the end of a welding electrode therebetween, said overhanging handle portion having a rear wall disposed transversely thereof and adapted to limit the extent of insertion of the electrode into said tool, a metal strip of high electrical conductivity mounted integrally therewith and alongside said handle member having said overhanging portion and extending about said overhanging portion to be integral therewith and to reinforce the latter and to conduct welding current from the lower end of said handle into said overhanging jaw portion, and electrical connection means at the lower end of said handle for detachably connecting an electrical conductor to the corresponding end portion of said metal strip.

3. A welding electrode holder of hand tool form comprising a pair of scissor handle portions pivoted together intermediately of their ends, a first one of said handle members having a reversely turned metallic end portion disposed to overhang the corresponding end portion of the other of said handle members when in tool closed position whereby to enclose upon and grip the end of a welding electrode therebetween while providing electrical contact therewith, the said end portion of the other of said handle members being sloped obliquely to the longitudinal axis thereof whereby to cam against the electrode for wedging the latter against said overhanging handle portion, said overhanging handle portion having a rear wall disposed transversely thereof and adapted to limit the extent of insertion of the electrode into said tool, and a strip of electrically conductive material knitted to said first one of said handle members to extend therealong and into electrical connection with said reversely turned metallic end portion.

4. A welding electrode holder comprising a pair of handle portions formed of steel or the like and pivoted together intermediately of their ends, one of said handle members having a reversely turned end portion formed of copper or the like and disposed to overhang the corresponding end portion of the other of said handle members when in tool-closed position whereby to enclose upon and grip the end of a welding electrode therebetween, a metal strip of high electrical conductivity mounted integrally therewith and alongside said handle member having said overhanging portion and extending about said overhanging portion to be integral therewith and to reinforce the latter and to conduct welding current from the lower end of said handle into said overhanging jaw portion, and electrical connection means at the lower end of said handle for detachably connecting an electrical conductor to the corresponding end portion of said metal strip.

JOHN L. FOLEY.
DANIEL B. MALARKEY.